(12) United States Patent
Weld

(10) Patent No.: US 8,336,208 B1
(45) Date of Patent: Dec. 25, 2012

(54) PROCESS FOR PRODUCING A CAST, COATED VEHICLE WHEEL

(76) Inventor: Brock Weld, Orange, CA (US)

(*) Notice: Subject to any disclaimer, the term of this patent is extended or adjusted under 35 U.S.C. 154(b) by 224 days.

(21) Appl. No.: 12/804,114

(22) Filed: Jul. 14, 2010

Related U.S. Application Data

(60) Provisional application No. 61/226,247, filed on Jul. 16, 2009.

(51) Int. Cl.
- *B21D 53/26* (2006.01)
- *B60B 19/00* (2006.01)
- *B23P 17/00* (2006.01)

(52) U.S. Cl. ............ 29/894.3; 29/527.5; 29/527.6; 29/894.325; 29/894.353; 301/5.1

(58) Field of Classification Search ........... 29/894.3, 29/894.325, 894.35, 894.353, 894, 527.5, 29/527.6, 527.1
See application file for complete search history.

(56) References Cited

U.S. PATENT DOCUMENTS

| | | | |
|---|---|---|---|
| 5,380,071 A * | 1/1995 | Kier, Jr. | 301/63.101 |
| 5,722,165 A * | 3/1998 | Kobayashi et al. | 29/894.325 |
| 7,036,227 B2 * | 5/2006 | Ling et al. | 29/893.33 |
| 2008/0086886 A1 * | 4/2008 | Kamiya | 29/894.3 |

* cited by examiner

*Primary Examiner* — Jermie Cozart
*Assistant Examiner* — Steven A Maynard
(74) *Attorney, Agent, or Firm* — Albert O. Cota

(57) ABSTRACT

A process for producing a cast, coated vehicle wheel utilizing a multi-axis computer numerical control (CNC) machine. The CNC machine allows unique draft angles and unique design elements to be cast from a single metal ingot. The process utilizes a plurality of steps to achieve the desired aesthetic qualities in the wheel including design elements such as colored portions, rivets, logos and the like.

18 Claims, 6 Drawing Sheets

PROCESS FOR PRODUCING A CAST, COATED VEHICLE WHEEL

This application claims priority of Provisional Patent Application No. 61/226,247 filed on Jul. 16, 2009.

TECHNICAL FIELD

The invention generally pertains to vehicle wheels, and more particularly to a process that utilizes a computer numerical control (CNC) machine to produce a cast, coated vehicle wheel.

BACKGROUND ART

The rim or wheel of a vehicle is the outer circular section of the metal on which the inside edge of a tire is mounted onto the vehicle. Aesthetic wheels have become a large part of vehicle customization and many individuals utilize unique and different wheel designs to illustrate their own identities and personalities. With so many different types of wheel designs, size and colors to choose from, it is important to develop unique, new, and quality wheels that are cost-effective to produce.

Most prior art vehicle wheels are made from steel or other metal alloys. Typically, a metal plate is bent to produce a sleeve with the two free edges of the sleeve welded together. Once the sleeve is welded, a portion of the wheel is angled-out to form the rim which supports a tire. Additionally, the rim is required to have openings that fit the center hub of the vehicle and a set of vehicle lug nuts which penetrate the rim from the wheel hub. The outer surface of the wheel typically has a cylindrical geometry to fit inside the rim.

In order to reduce costs and allow for easier production of vehicle wheels, one-piece wheels are preferred. One-piece wheels are manufactured by casting the wheel from a piece of metal. Casting has the advantage of being less time consuming, and more efficient than other types of wheel production. Wheel casting is performed at one time and does not require different pieces to be fit together, therefore, it is preferred to other types of wheel production. However, one disadvantage of cast wheel production is that casting typically does not include the aesthetic features that might be found in a wheel forging processes.

Wheels are also produced by forging a metal section into a shape that is utilized as a rim. Forging has progressed as an art and a tool for producing parts that may be utilized in many different devices, including vehicle wheel technology. More modern forging techniques now involve presses or hammers powered by compressed air, electricity, hydraulics and the like. The air, electronic and hydraulic presses allow for quick, accurate and efficient forging of a wheel and can quickly cool the material after the forging process is complete. Utilizing forging processes can produce a product that is much stronger and more resilient than other types of production, such as cast or machined products and further may produce wheels that have very different and unique aesthetic designs and typically forged rims are made from multiple metal pieces.

There are several types of forging processes that are currently utilized to produce a wheel. The two most common types are hot and cold forging. Most metal wheels are forged hot because the wheels are typically made of either iron or an iron alloy. This is done primarily because if hardening occurs during cold forging, hard materials such as iron and steel would become extremely difficult to work with. Additionally, elements like steel can be strengthened by different methods other than cold forging. Often times, hot forging is utilized to strengthen products by adding additional elements to the product to produce a stronger, more resilient by-product.

However, one problem with utilizing wheel making processes, is that manufacturing and producing coated wheels, especially colored coated wheels may be difficult, costly and prone to errors. Moreover, another problem with wheel design is the addition of rivets to the wheel design which typically must be performed separately from the casting and/or forging process, thereby requiring time and effort which increases cost to both the manufacturer and the consumer. The forging process can also be expensive and because the number of pieces required are often multiples, it takes both time and money to produce the desired aesthetic appearance.

What is needed is an improved wheel making process which can be utilized to cast a wheel that includes colored elements, yet still provide the desired aesthetic appearance without the cost normally associated therewith. A further need exists for a wheel producing process that utilizes a computer numeral control (CNC) machine to prepare and produce a unique cast, colored vehicle wheel.

A search of the prior art did not disclose literature or patents that read directly on the claims of the instant invention.

DISCLOSURE OF THE INVENTION

The present invention discloses a process for producing a cast vehicle wheel incorporating painted wheel elements. The process utilizes an advanced multi-axis computer numerical control (CNC) machine that allows the removal of draft angles and the machining of unique design elements that can be machined into a single cast aluminum wheel or wheel part. The process utilizes a plurality of process steps to achieve the desired design aesthetics which includes the machining of design elements such as rivets and logos that can be placed on both the wheel itself; the center part, the center cap and/or the rim portion of the wheel.

In its basic design configuration, the process is comprised of the following steps:
A. Provide a metal ingot,
B. Provide a CNC machine that removes draft angles from the metal ingot and cuts the face and the lip of the wheel,
C. Utilize end-mills to machine the sides of a set of spokes,
D. Utilize a coolant to operate the CNC machine,
E. Provide a peck-drill cycle tool to make rivets in the wheel without the need for forging the rivets,
F. Cleaning the wheel to remove the coolant and debris remaining from the machining process, and
G. Painting selected areas of the wheel.

In the preferred embodiment, the metal ingot is comprised of an A356 aluminum alloy ingot, and the specialized coolant is comprised of a water-based coolant. Oil based coolants cannot be used because they are absorbed into the pores of the cast aluminum surface which negatively affects the application of subsequent coats of paint.

In view of the above disclosure, the primary object of the invention is to provide a process for producing a cast, color enhanced vehicle wheel that is cost effective from both a manufacturer's and consumer's point of view.

In addition to the primary object of the invention, it is also an object of the invention to produce a vehicle wheel that:
  further comprises the step of utilizing a roughing pass and a finishing tool to smooth the aluminum cast wheel,
  utilizes a special heat treatment procedure to increase the hardness of the cast aluminum wheel,
  utilizes machine tools that are carbide based and incorporate chip breakers in the tool design, utilizes special toe-clamps and center collets to reduce chatter marks and the effects of vibrations and harmonics, employs a parametric CNC program which allows for feed rates and spindle RPM speeds that are specific to the process of the vehicle wheel design, utilizes end-mills, bull-nose end-mills, ball-mills, chamfer tools, V-tools, custom rivet tools, and other commonly used CNC milling tools, utilizes tools that are used to remove draft angles, engrave logos and other design elements onto the vehicle wheel, utilizes a roughing process which can be followed by a finishing tool and a finishing pass, utilizes a plastic portion which absorbs machine vibration and harmonics to reduce chatter marks on the wheel during manufacturing, allows for rivets to be machined into the wheel without the need to forge the rivets. The rivets are machined using a peck-drill cycle where the tool is partially inserted and then pulled back for chip relief before full plunge of the rivet tool, and utilizes unique CNC milling machines to machine the sides of the wheel spokes and to remove the draft angles.

These and other objects and advantages of the present invention will become apparent from the subsequent detailed description of the preferred embodiment and the appended claims.

BEST MODE FOR CARRYING OUT THE INVENTION

Figure 1A:
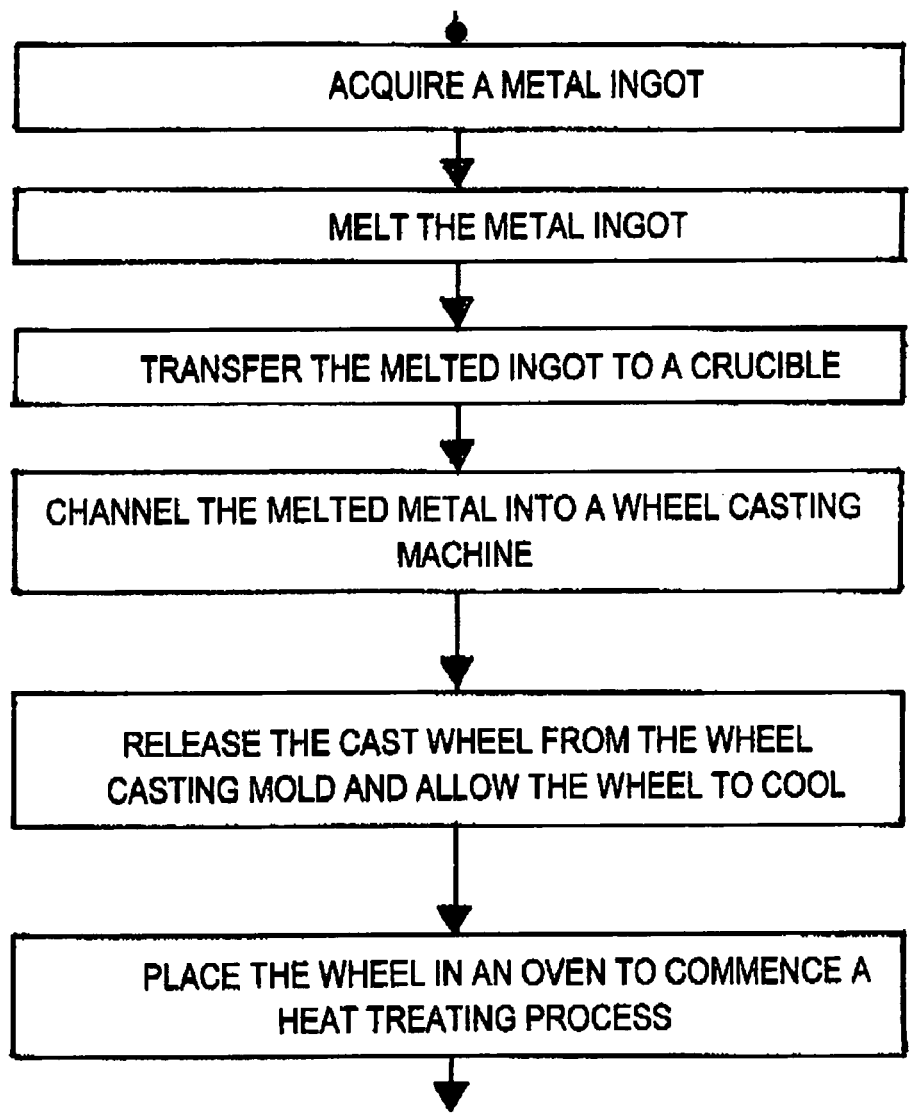
FIG. 1A, FIG. 1B and FIG. 1C is a first step-by-step drawings of the process.
Figure 1B:
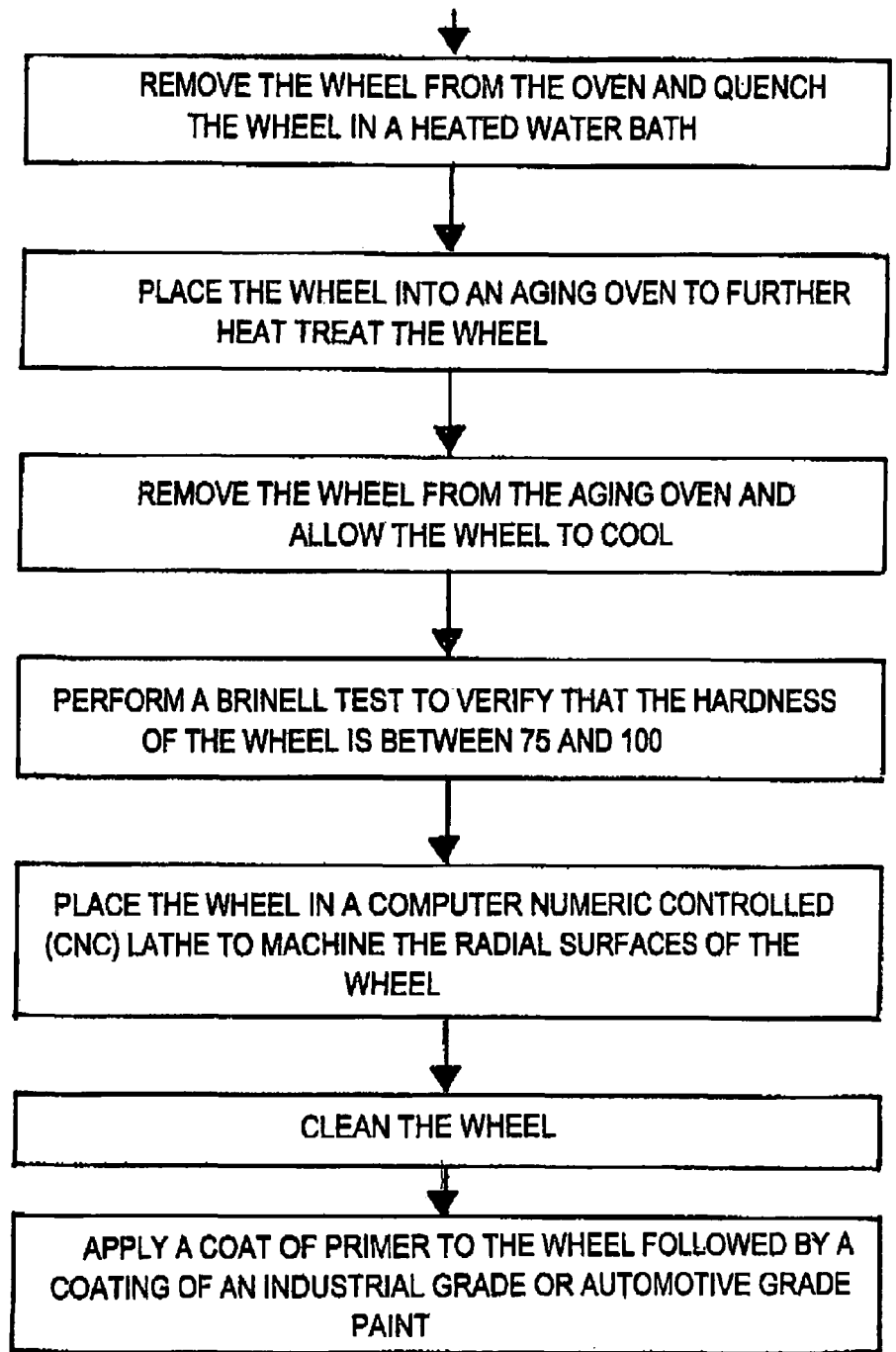
Figure 1C:
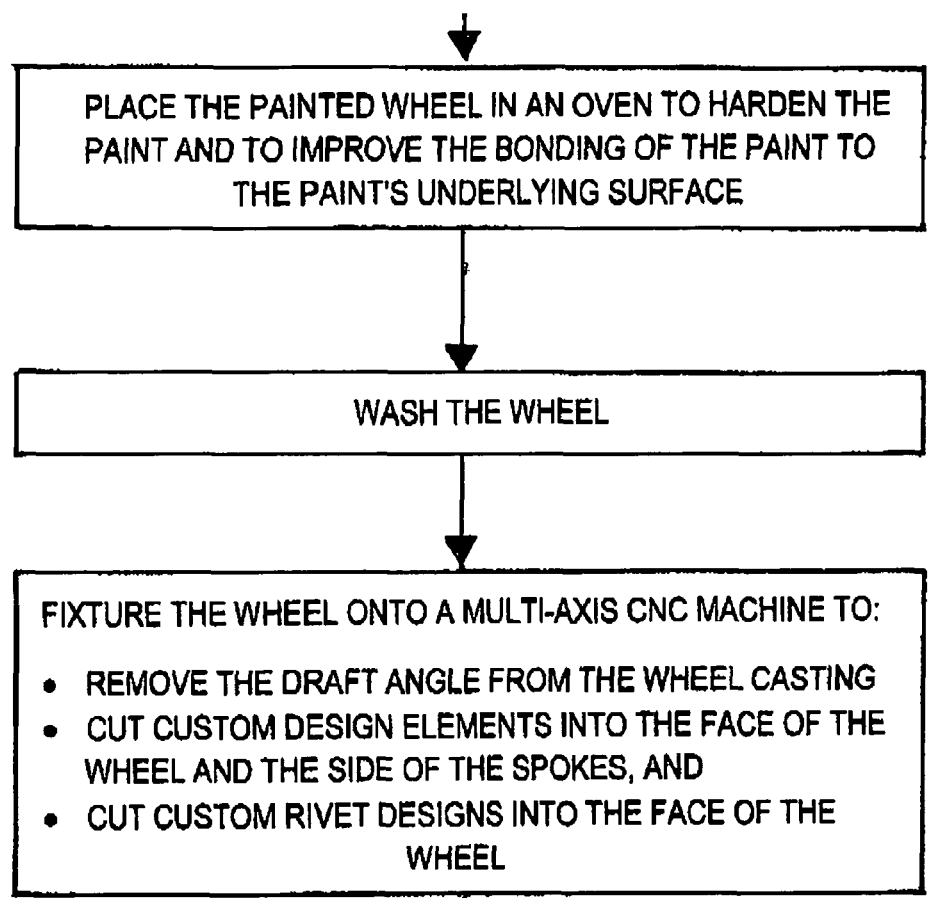
Figure 2A:
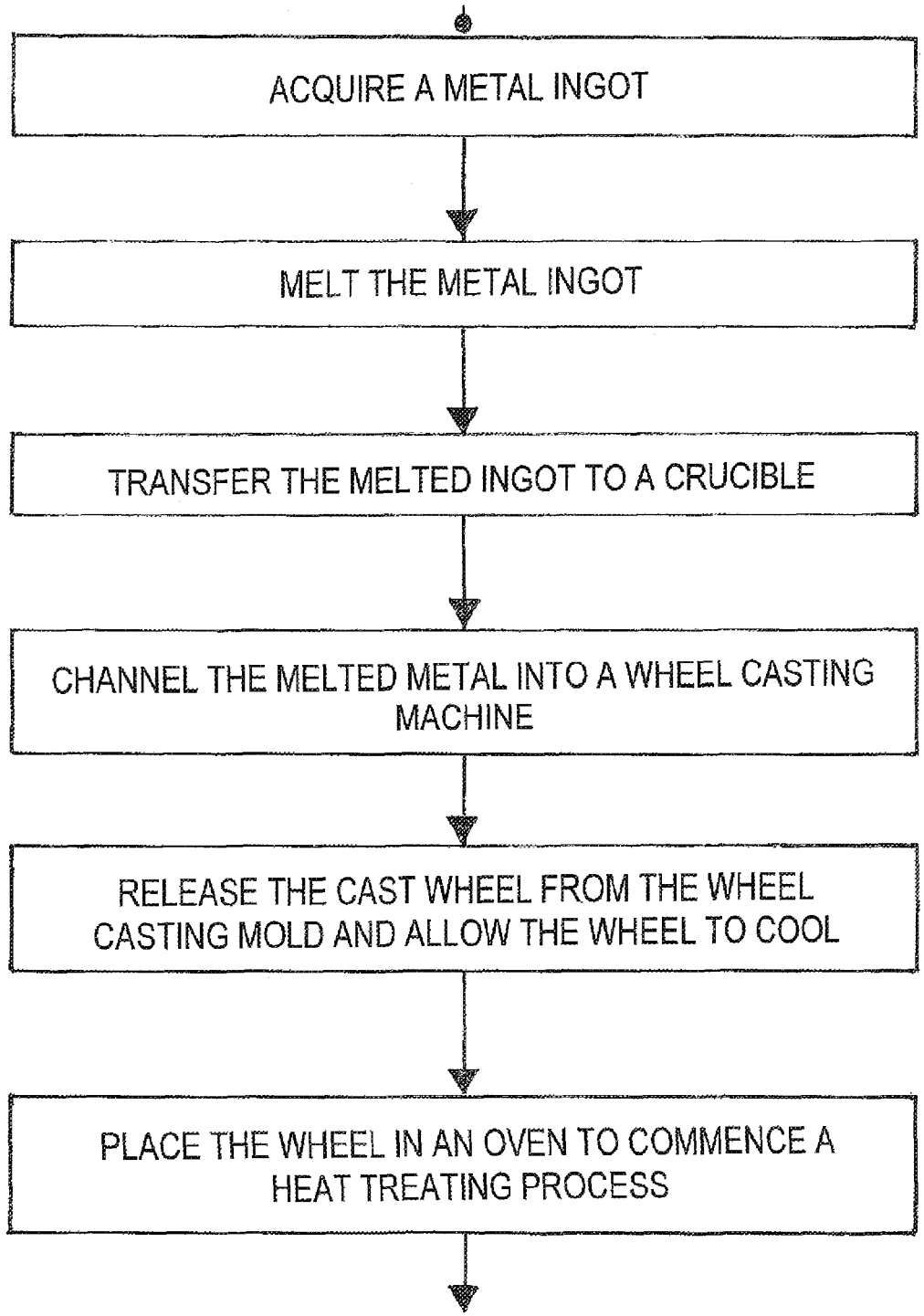
FIG. 2A, FIG. 2B and FIG. 2C is a second step-by-step drawings of the process.
Figure 2B:
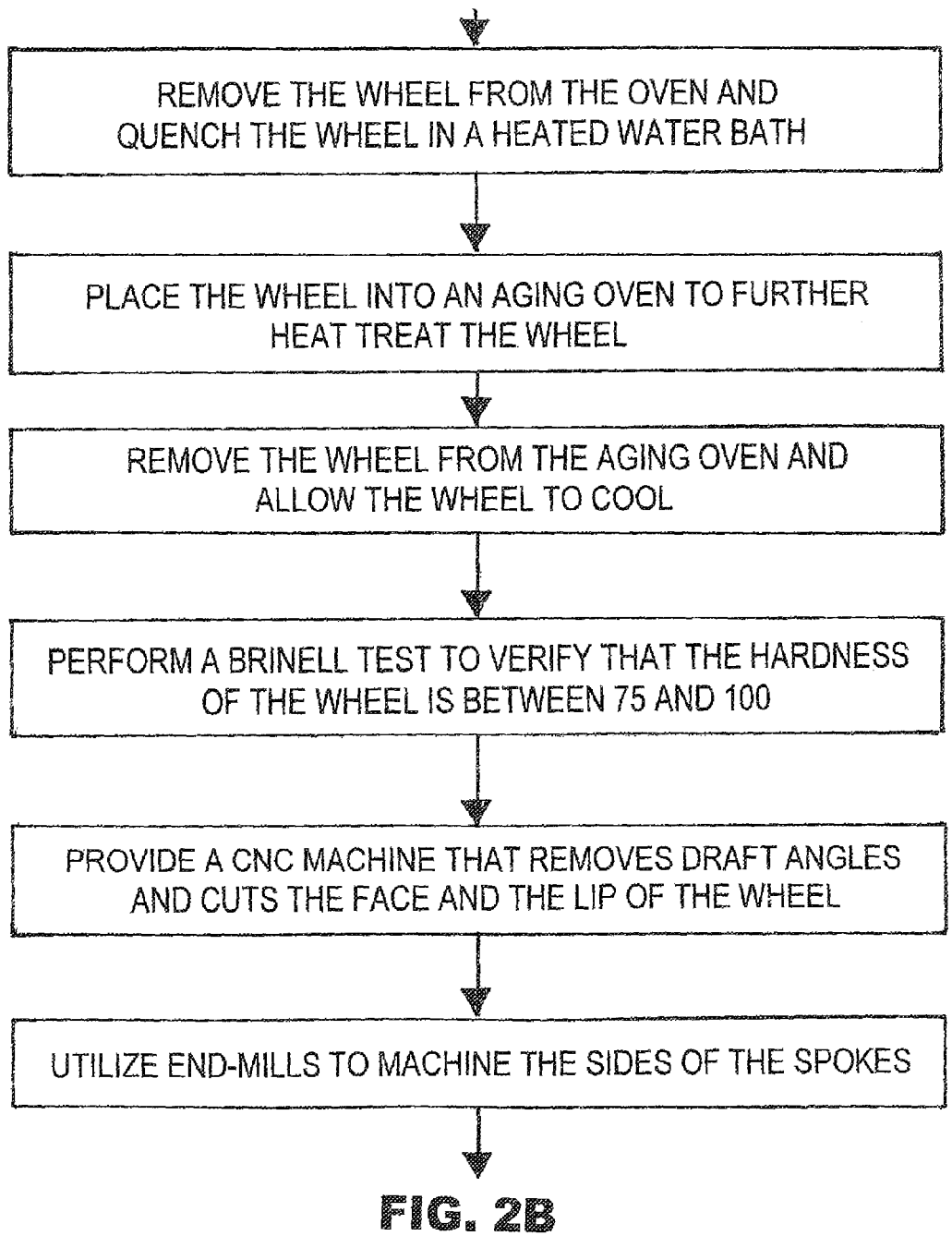
Figure 2C:
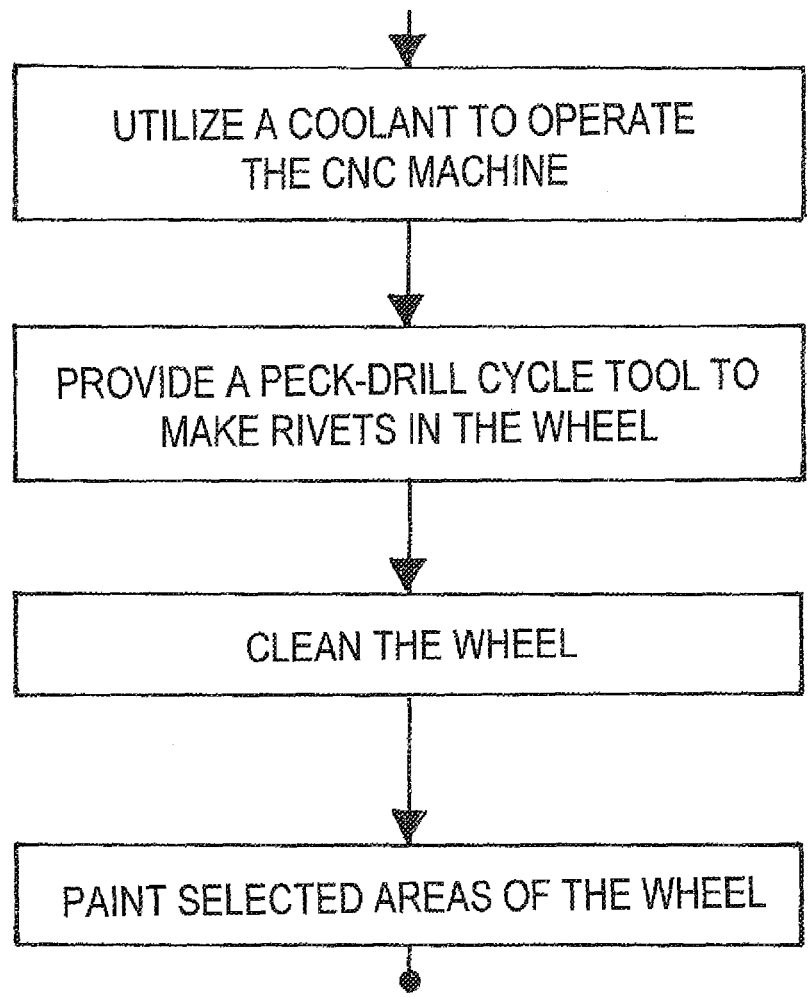

The best mode for carrying out the invention is presented in terms of a preferred embodiment that discloses a process for producing a cast and colored vehicle wheel. The process refers to a vehicle wheel (hereinafter "wheel") that is comprised of a face, a lip, spokes, rivets, a front, a back, side and a center bore. The process can be utilized to cast a complete wheel or individual wheel elements can be cast that are later attached to the wheel. The process is accomplished by performing the following steps:

a) acquire a metal ingot,
b) melt the metal ingot in a furnace set at a temperature of 1250-1350 degrees Fahrenheit,
c) transfer the melted ingot to a crucible,
d) channel the melted metal into a wheel casting machine,
e) release the cast wheel from the wheel casting mold and move the wheel to a staging area where the wheel is allowed to cool to room temperature,
f) place the wheel in an oven to commence a heat treating process that changes the wheel's mechanical properties, metallurgical structure and the residual stress state of the wheel. This treating process achieves a T4 hardness and involves increasing the wheel temperature to a temperature ranging from 525-645 degrees Centigrade for a time period ranging from 4.7-7.0 hours.
g) remove the wheel from the oven and quench the wheel in a heated water bath having a temperature ranging from 65-85 degrees Centigrade. The water bath rapidly cools the wheel to freeze the wheel's excited molecules to an optimum state of overall strength, elongation and ductility,
h) place the wheel into an aging oven to further heat treat the wheel. This heat treating process involves raising the wheel temperature to a temperature ranging from 255-315 degrees Centigrade for a time period ranging from 1.7-2.5 hours, D. Use of special toe-clamps and center collets in the CNC machine to reduce chatter marks in the machining process.

E. Fixturing the wheel to the CNC machine with Ultra-High Molecular Weight (UHMW) plastic to absorb machine vibration and harmonics to reduce chatter marks.

F. The coolant solution used to operate the CNC machine for this process is water based. Oil based coolants can not be used because they are absorbed into the pores of the cast aluminum surface and affects the application of the painting process.

G. Rivets are machined using a peck-drill cycle where a tool is partially inserted and then pulled back for chip relief before full plunge of the rivet tool is engaged.

H. CNC machining tools are carbide based and incorporate chip-breakers in the tool design to aid in the quality of the machine finish and to protect the adjacent painted areas from abrasion and heat.

I. Cleaning the vehicle's wheel after machining to remove coolant and other debris remaining from the machining process.

The above process can be utilized to cast centers on multi-piece wheels, cast rim shells for multi-piece wheels, cast one-piece rim halves and cast center caps.

In summary, the process is designed to produce a cast, coated (colored) vehicle wheel that utilizes a multi-axis computer numerical control (CNC) machine. The CNC machine allows the removal of draft angles and the machining of unique design elements that can be machined into a single cast aluminum wheel or a part of the wheel. The process utilizes a plurality of process steps to achieve the desired design aesthetics which includes the machining of rivets and logos that can be located on the wheel itself, the center part of the wheel and/or on the rim portion of the wheel.

While the invention has been described in detail it is not to be limited to such details, since many changes and modifications may be made to the invention without departing from the spirit and the scope thereof. Hence, it is described to cover any and all modifications and forms which may come within the language and scope of the claims.

The invention claimed is:

1. A process for producing a cast, coated vehicle wheel having a face, a lip, spokes and rivets, said process comprising the following steps:

a) acquire a metal ingot,
b) melt the metal ingot in a furnace,
c) transfer the melted ingot to a crucible,
d) channel the melted metal into a wheel casting machine,
e) release a cast wheel from the wheel casting mold and move the wheel to a staging area where the wheel is allowed to cool to room temperature,
f) place the wheel in an oven to commence a heat treating process that changes the wheel's mechanical properties, metallurgical structure and the residual stress state of the wheel, wherein the treating process achieves a T4 hardness and involves increasing the wheel temperature to a temperature ranging from 525-645 degrees Centigrade for a time period ranging from 4.7-7.0 hours,
g) remove the wheel from the oven and quench the wheel in a heated water bath having a temperature ranging from 65 to 85 degrees centigrade, wherein the water bath rapidly cools the wheel to freeze the wheel's excited molecules to an optimum state of overall strength, elongation and ductility, h) place the wheel into an aging oven to further heat treat the wheel, wherein this heat treating process involves raising the wheel temperature to a temperature ranging from 255-315 degrees Centigrade for a time period ranging from 1.7-2.5 hours, i) remove the wheel from the aging oven and allow the wheel to cool to room temperature to enhance the wheel's overall strength and surface hardness, j) perform a Brinell test to verify that the hardness of the wheel is between 75 and 100, k) provide a CNC machine that removes draft angles and cuts the face and the lip of said wheel, l) utilize end-mills to machine the sides of the spokes, m) utilize a coolant to operate the CNC machine, n) provide a peck-drill cycle tool to make rivets in the wheel, o) clean the wheel to remove the coolant and debris remaining from the machining process, and p) paint selected areas of said wheel.

2. The process as specified in claim 1 wherein the metal ingot is comprised of an aluminum alloy ingot.

3. The process as specified in claim 2 wherein the aluminum alloy ingot is comprised of an A356 aluminum alloy ingot.

4. The process as specified in claim 1 wherein the coolant is comprised of a water-based coolant.

5. The process as specified in claim 1 wherein the CNC machine is comprised of a multi-axis CNC machine.

6. The process as specified in claim 1 further comprising the step of applying industrial or automotive grade paint to selected areas of the wheel.

7. The process as specified in claim 5 wherein the multi-axis CNC machine cuts custom design elements into the face of the wheel and into the sides of the spokes.

8. The process as specified in claim 7 wherein the multi-axis CNC machine cuts custom rivet designs into the face and into the lip of said wheel.

9. The process as specified in claim 1 further comprising the step of utilizing a roughing pass and a finishing tool to smooth the cast wheel.

10. The process as specified in claim 5 wherein the multi-axis CNC machine tools are carbide based and incorporate chip breakers in the tool design.

11. The process as specified in claim 5 wherein the multiple axis CNC machine utilizes a special toe-clamp and a center collet that reduces chatter marks and the effects of vibration.

12. A process for producing a cast, coated vehicle wheel having a face, a lip, spokes and rivets, said process comprising the following steps:

a) acquire a metal ingot, b) melt the metal ingot in a furnace, c) transfer the melted ingot to a crucible, d) channel the melted metal into a wheel casting machine, e) release the cast wheel from the wheel casting mold and move the wheel to a staging area where the wheel is allowed to cool to room temperature, f) place the wheel in an oven to commence a heat treating process that changes the wheel's mechanical properties, metallurgical structure and the residual stress state of the wheel, wherein the treating process achieves T4 hardness and involves increasing the wheel temperature to a temperature ranging from 525-645 degrees Centigrade for a time period ranging from 4.7-7.0 hours, g) remove the wheel from the oven and quench the wheel in a heated water bath having a temperature ranging from 65 to 85 degrees centigrade, wherein the water bath rapidly cools the wheel to freeze the wheel's excited molecules to an optimum state of overall strength, elongation and ductility, h) place the wheel into an aging oven to further heat treat the wheel, wherein this heat treating process involves raising the wheel temperature to a temperature ranging from 255-315 degrees Centigrade for a time period ranging from 1.7-2.5 hours, i) remove the wheel from the aging oven and allow the wheel to cool to room temperature to enhance the wheel's overall strength and surface hardness, j) perform a Brinell test to verify that the hardness of the wheel is between 75 and 100, k) place the wheel in a computer numeric controlled (CNC) lathe to machine all the radial surfaces of the wheel, wherein this process involves at least two operations that machine the front, back, sides and the center bore of the'wheel, l) move the wheel to a paint staging area, where the wheel is cleansed and prepared for subsequent painting, m) apply a coat of primer to the wheel followed by a coating of an industrial grade or automotive grade paint, n) place the painted wheel in an oven or the like to harden the paint and to improve the bonding of the paint to the paint's underlying surface, o) wash the wheel after the wheel has dried, and p) fixture the wheel onto a multi-axis CNC machine, wherein the machine is used to:

(1) remove the draft angle from the wheel casting, (2) cut custom design elements into the face of the wheel and the side of the spokes, and (3) cut custom rivet designs into the face of the wheel and/or to the lip of the wheel, wherein items (1)-(3) are performed after the wheel is painted to produce a wheel having contrasting painted surfaces that are adjacent to the machined surfaces.

13. The process as specified in claim 12 wherein said metal ingot is comprised of an aluminum alloy ingot.

14. The process as specified in claim 13 wherein said aluminum alloy ingot is comprised of an A356 aluminum alloy ingot.

15. The process as specified in claim 12 wherein the wheel casting machine is comprised of a low pressure, gravity or counter-pressure wheel casting machine.

16. The process as specified in claim 12 wherein the heated liquid solution is comprised of a water-based solution.

17. The process as specified in claim 12 wherein said process can be utilized to cast a complete wheel or individual wheel elements can be cast that are later attached to the wheel.

18. The process as specified in claim 12 wherein said process is utilized to cast centers on multi-piece wheels, cast rim shells for multi-piece wheels, cast one-piece rim halves and cast center caps.

* * * * *